(12) United States Patent
Shor et al.

(10) Patent No.: US 9,521,636 B2
(45) Date of Patent: Dec. 13, 2016

(54) SYNCHRONIZATION CIRCUITRY, COMMON PUBLIC RADIO INTERFACE ENABLE DEVICE, AND A METHOD OF SYNCHRONIZING A SYNCHRONIZED CLOCK SIGNAL OF A SECOND TRANSCEIVER TO A CLOCK OF A FIRST TRANSCEIVER

(71) Applicants: Roi Menahem Shor, Tel Aviv (IL); Ori Goren, Kibutz Ruchama (IL); Avraham Horn, Givat Shmuel (IL)

(72) Inventors: Roi Menahem Shor, Tel Aviv (IL); Ori Goren, Kibutz Ruchama (IL); Avraham Horn, Givat Shmuel (IL)

(73) Assignee: NXP USA, INC., Austin, TX (US)

( * ) Notice: Subject to any disclaimer, the term of this patent is extended or adjusted under 35 U.S.C. 154(b) by 249 days.

(21) Appl. No.: 14/258,415

(22) Filed: Apr. 22, 2014

(65) Prior Publication Data
US 2015/0304971 A1 Oct. 22, 2015

(51) Int. Cl.
*H04W 56/00* (2009.01)
*H04L 7/033* (2006.01)

(52) U.S. Cl.
CPC .......... *H04W 56/001* (2013.01); *H04L 7/0331* (2013.01)

(58) Field of Classification Search
CPC ...... H04W 56/001; H04L 7/033; H04L 7/0331
See application file for complete search history.

(56) References Cited

U.S. PATENT DOCUMENTS

| 6,259,328 B1 * | 7/2001 | Wesolowski | H03L 7/143 327/147 |
| 6,275,553 B1 | 8/2001 | Esaki | |
| 6,928,128 B1 * | 8/2005 | Sidiropoulos | H03K 5/133 327/157 |

(Continued)

OTHER PUBLICATIONS

Ericsson AB et al., "CPRI Specification V6.0: Common Public Radio Interface (CPRI); Interface Specification," Ericcson AB, Huawei Technologies Co. Ltd., NEC Corp., Alcatel Lucent, Nokia Siemens Networks GmbH & Co. KG; Aug. 30, 2013; downloaded from <<http://www.cpri.info/spec.html>>, 128 pages.

(Continued)

*Primary Examiner* — Paul H Masur
*Assistant Examiner* — Kabir Jahangir

(57) ABSTRACT

A controller device can control the time of a slave sub-system in a chain in a base station system. The controller device comprises a slave transceiver for receiving/transmitting from/to a master sub-system, and a synchronization device for synchronizing a clock of the slave transceiver to a clock of the master sub-system based on the received signal received from the master sub-system. The synchronization circuitry comprises a clock input port for receiving an external clock signal from an external clock generator. At a received signal input port the received signal can be received from the master transceiver. A tracking loop couples the received signal input and the second phase input to a control input of a controllable PLL, for providing a negative feedback which controls a phase and/or frequency of the feedback signal to counter the phase and or frequency error between the external clock signal and the received signal.

16 Claims, 7 Drawing Sheets

(56) References Cited

U.S. PATENT DOCUMENTS

| | | | |
|---|---|---|---|
| 2001/0015678 A1* | 8/2001 | Wesolowski | H03L 7/143 331/14 |
| 2007/0116046 A1 | 5/2007 | Liu et al. | |
| 2007/0195829 A1* | 8/2007 | Akahori | H03L 7/00 370/503 |
| 2007/0195916 A1 | 8/2007 | Itahara | |
| 2009/0115472 A1* | 5/2009 | Pfaff | G06F 1/08 327/156 |
| 2009/0238154 A1 | 9/2009 | Bommas et al. | |
| 2009/0245228 A1 | 10/2009 | Osterling | |
| 2010/0329404 A1 | 12/2010 | Xiang et al. | |
| 2011/0032910 A1* | 2/2011 | Aarflot | H04J 3/0682 370/335 |
| 2012/0170699 A1* | 7/2012 | Fischette | H03D 3/24 375/376 |
| 2013/0045779 A1* | 2/2013 | Kothari | H03K 3/0315 455/572 |
| 2013/0107998 A1 | 5/2013 | Przada et al. | |
| 2014/0077849 A1* | 3/2014 | Chen | H03L 7/08 327/156 |

OTHER PUBLICATIONS

U.S. Appl. No. 14/258,394, filed Apr. 22, 2014 entitled "Device and Method for Synchronization in a Mobile Communication System".
Non-Final Office Action mailed Feb. 17, 2015 for U.S. Appl. No. 14/258,394, 14 pages. (892).

* cited by examiner

SYNCHRONIZATION CIRCUITRY, COMMON PUBLIC RADIO INTERFACE ENABLE DEVICE, AND A METHOD OF SYNCHRONIZING A SYNCHRONIZED CLOCK SIGNAL OF A SECOND TRANSCEIVER TO A CLOCK OF A FIRST TRANSCEIVER

CROSS REFERENCE TO RELATED APPLICATIONS

The present application is related to co-pending U.S. patent application Ser. No. 14/258,394, entitled "DEVICE AND METHOD FOR SYNCHRONIZATION IN A MOBILE COMMUNICATION SYSTEM," filed on Apr. 22, 2014, the entirety of which are herein incorporated by reference.

FIELD OF THE INVENTION

This invention relates to a controller device, an integrated circuit, an RF or baseband sub-system, a mobile communication system base station and a method of synchronizing a synchronized clock signal of a second transceiver to a clock of a first transceiver.

BACKGROUND OF THE INVENTION

In the past, base-stations would be provided with a small cabinet at the base of the antenna tower, in which appropriate equipment to perform all base-station functions was provided. Thus each antenna would have its own dedicated equipment for both the RF functions and the baseband functions. However, newer generations of radio base station systems use a split into sub-systems so that the baseband functions are separated from the RF functions and provided in another subsystem.

The baseband subsystem is typically in a cabinet or other housing, and connected to a remote RF subsystem via an optical fiber of suitable length or other, e.g. wired, link suitable to transport signals over a long distance (typically the baseband and RF subsystem are separated by a distance of 1 km or more, e.g. >10 km). The remote RF subsystem is housed in what is commonly referred to as a "radio head" which further contains the antenna. Furthermore, the baseband subsystem may be connected to several antennas separated from each other by relatively long distances (>1 km or more, e.g. >10 km) and control the RF subsystems of multiple radio units. The radio-heads of several spaced-apart antennas are thus simultaneously controlled by the same base-station, located at a distance from the radio-heads.

In such new generations of base-stations, multiple radio equipment controller (REC) units and/or radio equipment (RE) units may be coupled in a chain, while such a chained unit may process part of the data samples and/or control data and forward a further part to a subsequent unit. The units may have, for interfacing between the units, a data interface for streaming data samples using a transmit clock. The clocks of the subsystems of the chain typically need to be synchronized with high precision. For example both the Open Base Station Architecture Initiative (OBSAI) and the Common Public Radio Interface (CPRI) require such high accuracy synchronization.

The standard "Common Public Radio Interface (CPRI); Interface Specification V5.0 (2011-09-21)", hereinafter CPRI 5.0, describes an example of the interface, abbreviated as CPRI. The CPRI configuration may have multiple baseband subsystems, called Radio Equipment Controllers (REC), and/or multiple RF subsystems, called Radio Equipments (RE), connected point to point in a chain network using very high frequencies (up to 9.8304 GHz in CPRI V5.0) for streaming interfacing. Data samples are received at the RE and interfaced to the REC via an IQ data link called a lane, in a data format based on the I and Q components of the modulated signal. Besides IQ data link, CPRI supports further types of communication and management (C&M) data: a Vendor Specific ("VSS") channel, a High-Level Data Link Control, HDLC, ("slow C&M channel") and an Ethernet link ("fast C&M channel").

According to the CPRI standard the Radio Equipment Controllers (REC) and Radio Equipment (RE) may be connected to each other via the CPRI interface point to point or in a chain. Several speeds are defined for the CPRI links and the highest speed in CPRI V5.0 is 9.8304 GBaud. Two, in the logical network structure (so not necessarily physically), neighboring devices are coupled to each other via a CPRI connection of which one part is defined as a master port and the other port is defined as the slave port.

The device at the slave port has to synchronize to the master port for all link rates. CPRI defines very strict synchronization requirements and it should be possible to synchronize over, e.g., a distance of up to 40 km. For example, requirement R-18 of CPRI 5.0 recites: "Maximum contribution of $\Delta f/f_0$ of jitter from the CPRI link to the radio base station frequency accuracy budget (between master $SAP_S$ and slave $SAP_S$) is ±0.002 ppm". Requirement R-18 also imposes that each slave port receives a clock signal traceable to the clock of the Radio Equipment Controller acting as synchronization master (of, for example, the chain of devices). When the devices are coupled in a chain, the master REC device provides its clock signal to the neighboring (RE or slave REC) device (e.g., for CPRI directly connected to the master port(s) of the master REC device). The neighboring device generates an internal clock signal that is based on the received clock signal of the master REC, and this generated internal clock signal may be provided to a subsequently neighboring (RE) device.

FIG. 1 shows a prior art CPRI system which comprises a master REC 110, which is an example of a synchronization master, and a synchronization slave device 150, such as a slave REC or a slave RE. A distance between the master REC 110 and the slave device 150 may be more than 10 Km, but the master REC 110 and the slave device 150 may also be located at the same location but at, for example, other boards of the base station. The master REC 110 and the slave device 150 are connected to each other via a CPRI links 102, which are bidirectional and allow to transmit data from the master to the slave, as indicated with "CPRI Tx", or vice versa, as indicated with "CPRI Rx". Slave device 150 may also be coupled by a further CPRI link 192 to a subsequent slave device (not shown). The subsequent slave device may be a RE and may have a similar architecture as slave device 150.

The master REC 110 receives from a separate oscillator 112 a signal which is used to generate the transmission clock signal Tx Clk. The master REC device generates the clock signal Tx Clk on basis of its internal oscillator PLL. The transmission clock signal Tx Clk is provided to the CPRI circuitry and to a SerDes circuitry 118 which transmits a signal such that the slave device 150 can use the received signal to synchronize to the Tx Clk signal of the master REC 110. A SerDes circuitry transforms the received serial signal into a parallel signal and transforms the internally generated parallel signals into a serial signal. In the slave device 150, as a termination point of the CPRI link 102, also a SerDes circuitry 158 is provided. The SerDes circuitry 158 generates on basis of the received signal the Clock Data Recovery clock signal Rx CDR which is used in the SerDes circuitry 158 to de-serialize/demodulate the received CPRI signal such that the SerDes circuitry 158 can provide a received parallel CPRI signal to the CPRI core circuitries. The slave device 150 has also an input port to which an output signal of a separate oscillator OSC, 152 must be provided to generate the internal transmission clock signal Tx Clk which has approximately the frequency of the CPRI link 102. The Tx Clk signal is provided to a subsequent SerDes circuitry 168 of the slave device 150 such that a correct CPRI signal may be generated for the subsequent CPRI link 192.

The internal transmission clock signal Tx Clk is generated by a PLL connected to the input port. As mentioned, this Tx Clk signal generated in the slave device 150 must fulfill various synchronization and jitter requirements. Common Phase Locked Loops (PLL) have a jitter accuracy of ±200 ppm, whereas ±0.002 ppm is required. To achieve the very strict synchronization requirements, the (slave) (RE) devices thus have to use an external jitter cleaner PLL (JCPLL) that is provided in between the oscillator of the port of at which the (slave) (RE) device expects to receive the oscillator signal. The JCPLL also receives from the device a receiver clock signal which is the internal clock used by the receiver of the device to de-serialize and/or demodulate the signals from the master device.

As shown in FIG. 1, the oscillator OSC, 152 is not directly coupled to the input port, but an external jitter cleaner PLL 154, JCPLL is coupled between the oscillator OSC, 152 and the input port. Furthermore, the Clock Data Recovery clock signal Rx CDR is provided to a frequency divider 160 which brings the frequency of the Clock Data Recovery clock signal Rx CDR towards the frequency of the oscillator OSC, 152 and the divided Clock Data Recovery clock signal is provided to the jitter cleaner PLL 154, JCPLL. Internally, in the SerDes circuitry 158, the signal received from the jitter cleaner PLL 154, JCPLL is also used to generate the Clock Data Recovery clock signal Rx CDR. In this way the Jitter cleaner PLL 154, JCPLL is able to create a clock signal at the (clock) input port of the SerDes circuitry 158 such that all internal clocks of the slave device 150 are well synchronized to the transmission clock signal Tx Clk of the master REC 110 without the introduction of too much jitter.

However, the external jitter cleaner is costly, typically in the order of 10 to 20 USD and increases the footprint of the device. Also, when using an external jitter cleaner, the board designer has to integrate all the components and test them.

SUMMARY OF THE INVENTION

The present invention provides a controller device, an integrated circuit, an RF or baseband sub-system, a mobile communication system base station and a method of synchronizing a synchronized clock signal as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the FIGS. corresponding elements have the same reference numerals throughout.

DETAILED DESCRIPTION OF THE PREFERRED EMBODIMENTS

Because the illustrated embodiments of the present invention may for the most part, be implemented using electronic components and circuits known to those skilled in the art, details will not be explained in any greater extent than that considered necessary for the understanding and appreciation of the underlying concepts of the present invention and in order not to obfuscate or distract from the teachings of the present invention.

Figure 4:
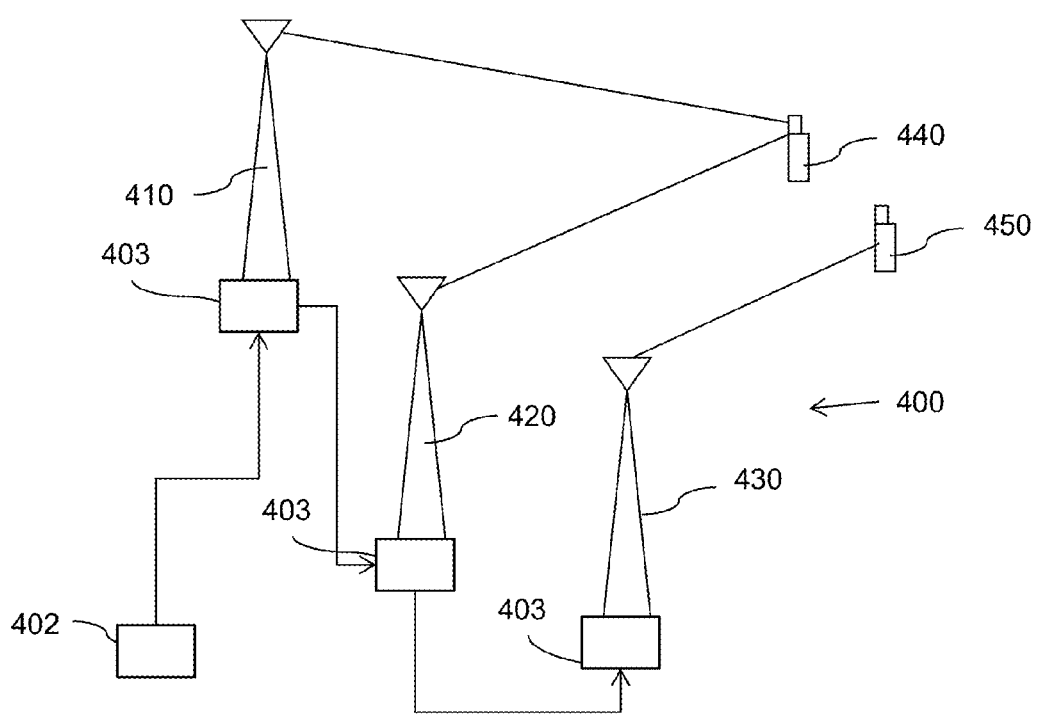
FIG. 4 shows schematic view of an example of a mobile communication system.

FIG. 4 shows an example of an overview of a mobile communication base-station system. The base-station system comprises a chain of sub-systems 402,403 comprising one or more first sub-systems 402, e.g. a baseband sub-system such as a CPRI Radio Equipment Controllers (REC), and one or more second sub-systems 403, e.g. RF sub-systems such as a CPRI Radio Equipment (RE).

In the example, each of the second subsystems 403 is connected to a respective antenna 410,420,430 for transmitting and receiving radio signals. The antennas 410,420,430 provide a radio connection from and/or to mobile devices 440, 450, also referred to as user equipment, such as a mobile telephone or another type of device used directly by an end-user to communicate over the mobile communication network of which the base-station is part. A first user equipment 440 is shown to communicate with multiple, e.g. two, antennas 410 and 420, e.g. in a communication handover process, and the other user equipment 450 is shown to communicate with a single antenna 430.

Figure 3:
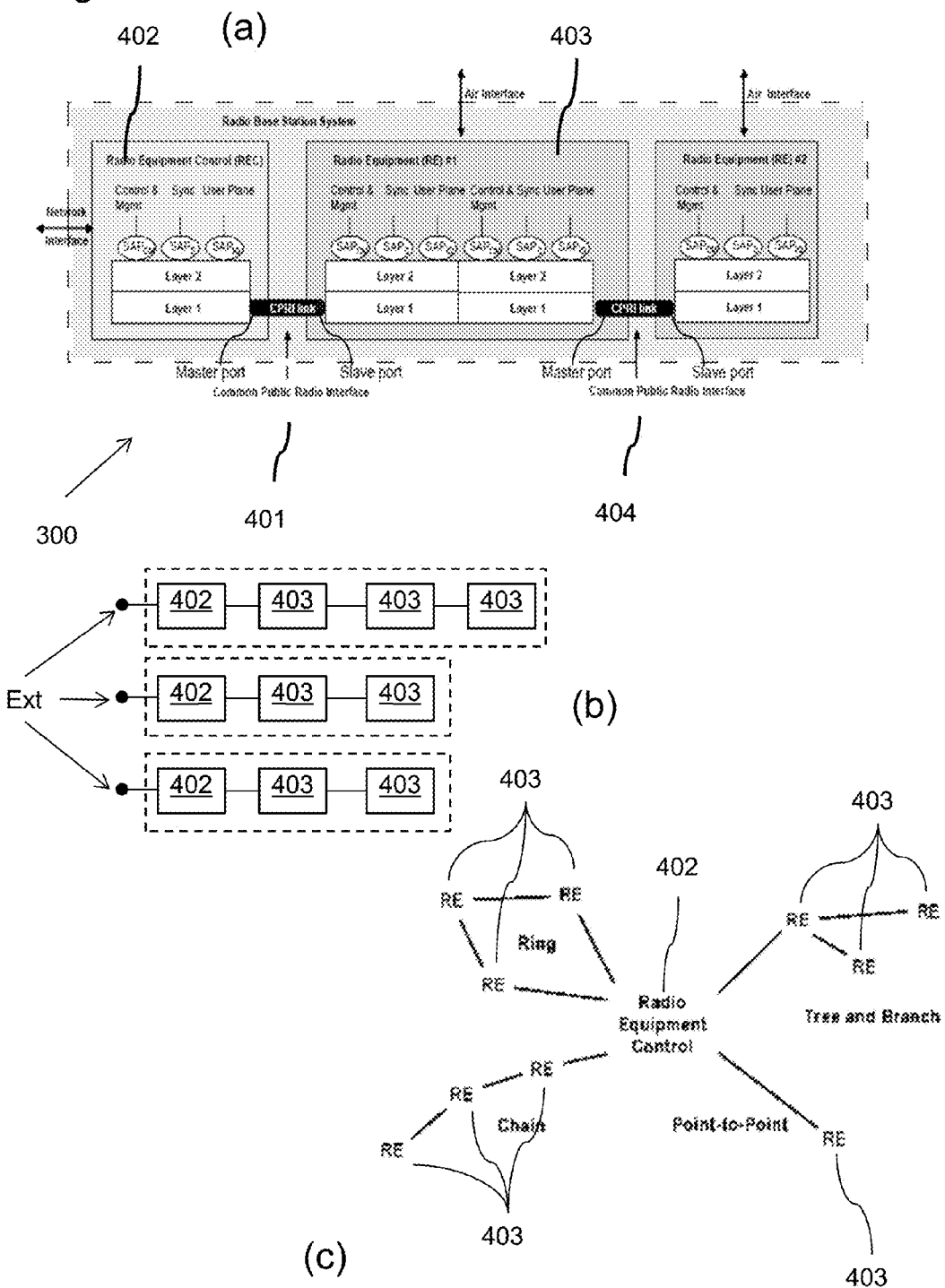
FIG. 3(a)-(c) schematically illustrate examples configuration of chains of sub-systems suitable for the example of FIG. 4.

In the example of FIG. 4 only a single chain is shown, for sake of simplicity. However it will be apparent that the system may comprise two or more chains of a suitable topology, as e.g. shown in FIG. 3(c). As shown in FIG. 3(b), the mobile communication network may comprise multiple chains. The chains may have the same, or a different, number of sub-elements and may have the same or a different topology. The synchronization masters 402 of the different chains may be connected to the same external synchronization source Ext and synchronize their timing to an external synchronization signal provided by the external source Ext, such as a GPS or Ethernet signal. Thereby, it can be ensured that not only the timing of the sub-systems in the same chain, but also between the different chains is synchronized.

Referring back to FIG. 4, the first sub-system 402 controls one or more aspects of the second sub-systems 403, and notably can control the clock synchronization of the sub-systems controlled by the first sub-system and hence acts as a synchronization master. In the shown example, the first sub-system 402 is a synchronization master controlling a time synchronization of the sub-systems in the chain of which the first sub-system is the synchronization master. The first sub-system 402 transmits a signal to the second sub-systems in the chain which allows the second subsystems to synchronize their timing to the first sub-system, e.g. using clock and data recovery to extract the clock from a data signal, such as a signal defined in common public radio interface, CPRI, specification version 1.4, 2.1, 3.0, 4.0, 4.1, 4.2, 5.0, 6.0 or higher, the contents of which are incorporated herein by reference.

Referring to FIG. 3(a), the sub-elements 402,403 in a chain 300 may be connected via respective interfaces 401, 402. The interface between the sub-systems allows the sub-systems to communicate data in accordance with a communication protocol common to the sub-systems, e.g. complaint or compatible with the CPRI specification. The interface allows to interconnect multiple sub-systems via a point-to-point connections, e.g. in a chain, ring or tree topology, as illustrated in FIG. 3(c). The interfaces can provide a single point-to point connection between sub-systems and/or multiple point-to-point connections between sub-systems. Thus, for example a second sub-system can be connected to multiple first sub-systems, a first sub-system can be connected to multiple second sub-systems, and between two sub-systems multiple connections may be present. Thereby, the chain can e.g. have a star, chain, ring or tree topology.

The interfaces 401 have a master port and a slave port. Each point-to-point link may for example have a master port in a first sub-element and a slave port in another sub-element. A slave port is connectable to a master port, and a sub-element synchronizes to the clock received at the slave port. Thus, each sub-element is a synchronization master of the sub-elements connected to its master port, and a synchronization slave of the sub-element connected to its slave port. For example, the clock used for frequency generation in the sub-element may be synchronized to the bit clock of the data received at the slave port. For example, each sub-element can receive on its slave port a clock traceable to the main clock of the synchronization master, e.g. by each sub-element using a transmit clock to output data at its master ports generated from the clock retrieved from one of its slave ports, e.g. by using the main clock as an input of a PLL and the PLL outputted clock as the transmit clock. In the following example, for ease of understanding, the interface is supposed to be compliant with the CPRI specifications as defined in "Common Public Radio Interface (CPRI); Interface Specification V6.0 (2013-08-30)", which is incorporated herein by reference, and herein after referred to as a CPRI interface. However, the interface may be any other suitable interface, such as compliant or compatible with another CPRI version or with OBSAI, and the sub-system may be any other type of sub-system suitable for a base-station system.

As example of a base-band sub-system the Radio Equipment Controller (REC) defined in CPRI is used, whereas as an example of an RF sub-system the Radio Equipment (RE) defined in CPRI is used. The REC is an example of a base-band subsystem containing the functions of the digital baseband domain, such as the network interface transport, the radio base station control and management as well as the digital baseband processing (such as coding, interleaving etc). The RE is an example of an RF subsystem containing the analogue radio frequency functions, such as RF filtering, RF modulation, frequency conversion and RF amplification.

A CPRI compliant or compatible system may have one or multiple RECs and one or multiple RE's connected via point-to-point links using high frequencies (e.g. in the GHz range, such as between 1 and 10 GHz, such as around 1.23, 2.46, 4.91 or 9.81 GHz) for streaming interfacing. The data rate of the interface may be an integer multiple (e.g. 40, 80, 160, 320) of the reference clock of the synchronization master. Data samples are received at the RE and interfaced to the REC via an IQ data link called a plane, in a data format based on the I and Q components of the modulated signal. Besides IQ data link, CPRI supports further types of communication and management (C&M) data: a Vendor Specific ("VSS") channel, a HDLC ("slow C&M channel") and an Ethernet link ("fast C&M channel").

As for other types of interfaces, CPRI uses a synchronized clock distributed across the sub-systems in a chain. In order to synchronize, each chain of sub-systems comprises a REC which is a timing or synchronization master, hereinafter a REC-master, which controls time-synchronization of the chain. A REC-master may control transmission of a periodic timing signal through the chain to which the sub-elements synchronize their clocks. For example, periodically e.g. every 10 ms, a predetermined sequence of bits which operates as synchronization signal may be transmitted by the REC-master, and be re-transmitted by the sub-systems in the CPRI chain on their master ports. (In CPRI, the predetermined sequence of bits indicates a start of a 10 ms frame consisting of 150 hyper-frames, which in turn consists of 256 basic frames.) This synchronization signal is thus common to all the sub-systems in the chain. The bit clock of this synchronization signal may be a divided clock of the transmit clock. Thereto the Radio Equipment Controllers (REC) may be provided with a clock generator which can be synchronized to the external synchronization signal. In the clock generator, the clock synchronization may be implemented using a controller device.

Figure 1:
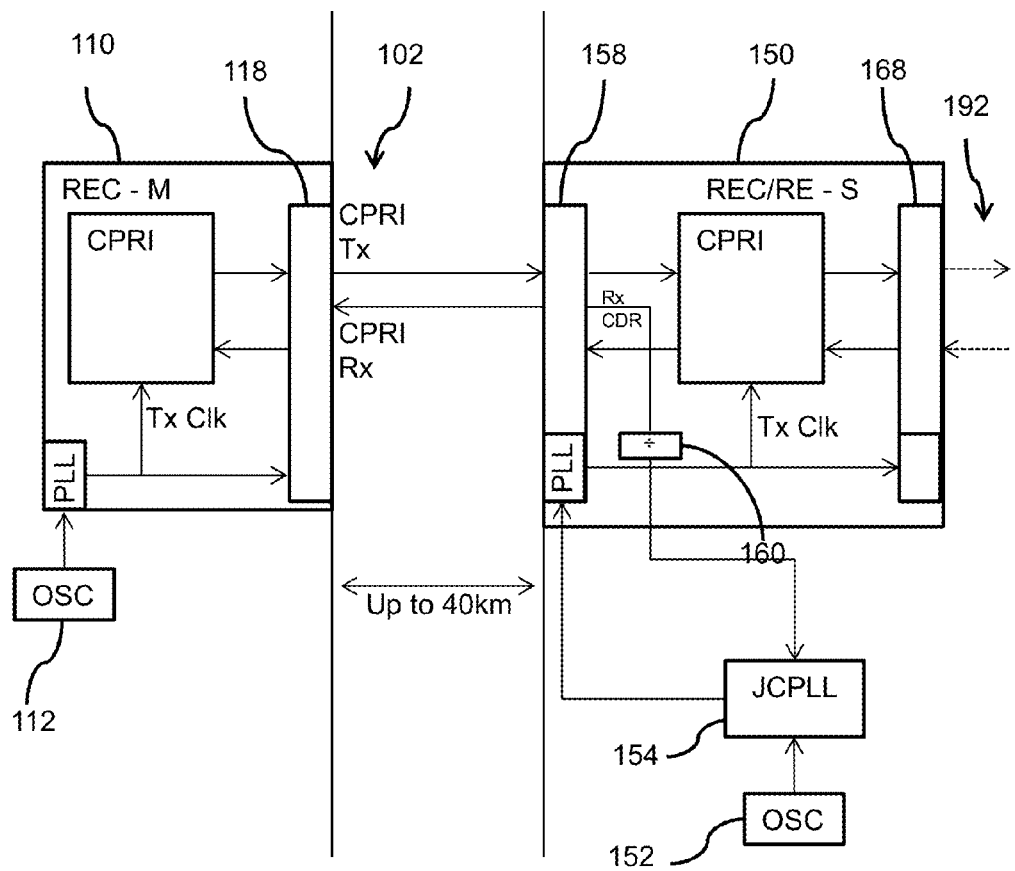
FIG. 1 schematically shows an example of a prior art embodiment of the use of a jitter cleaner PLL in networks between devices based on CPRI links.
Figure 2:
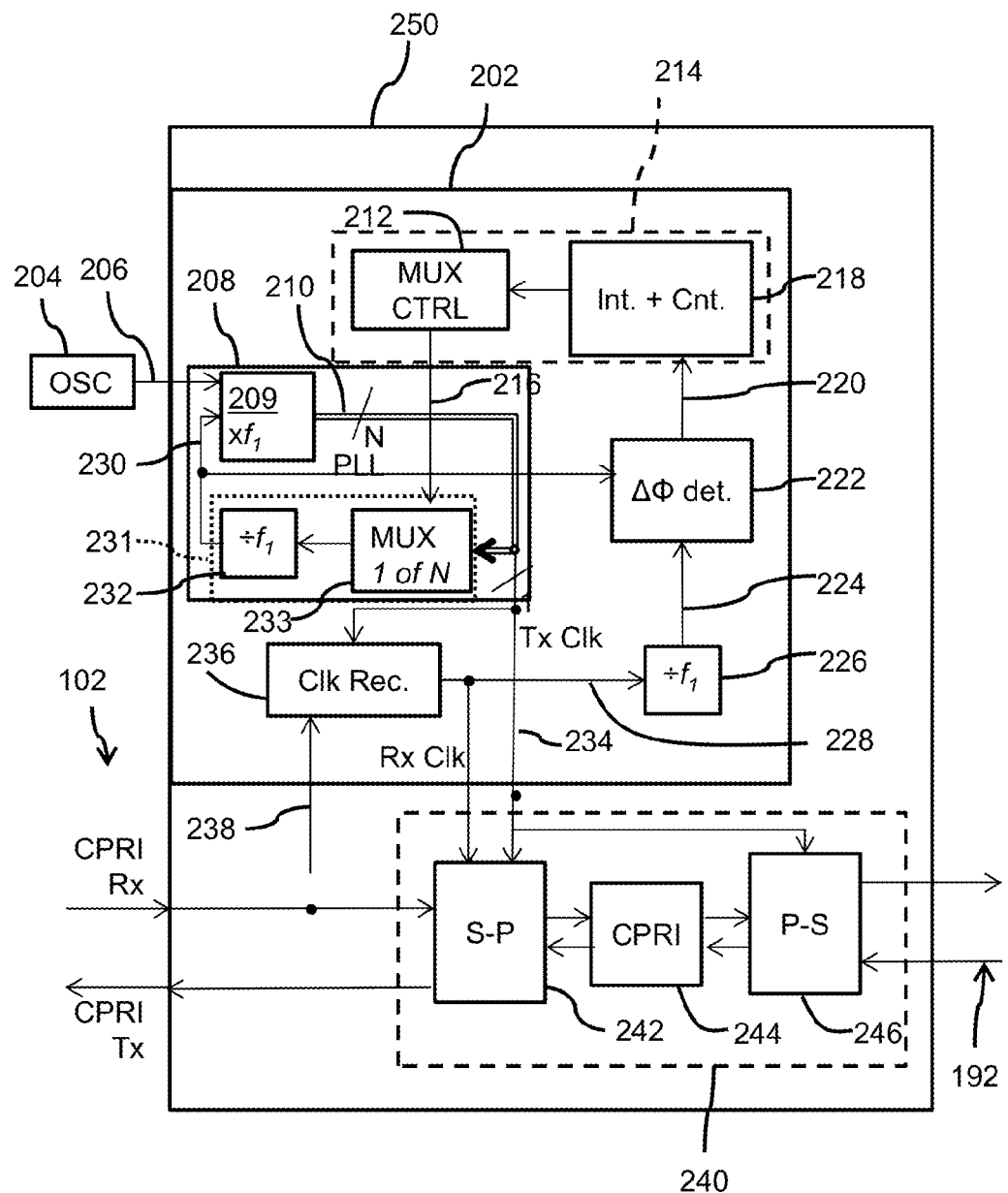
FIG. 2 shows a block diagram of an example of an embodiment of a device with synchronization circuitry, suitable for the examples of FIGS. 3 and 4.

FIG. 2 schematically shows an embodiment of a synchronization circuitry 202. The synchronization circuitry 202 is provided in a (slave) controller device 250 which is connected with CPRI link 102 to a master device (not shown). The controller device 250 may be (part of) a (slave) REC or RE.

The controller device 250 comprises a transceiver 240, in this example CPRI transceiver with a CPRI core circuitry 244. The CPRI core circuitry 244 receives from the serial-parallel converter S-P, 242 a parallelized CPRI Rx signal. The serial-parallel converter S-P, 242 is also able to serialize the parallel CPRI Tx signal generated by the CPRI core circuitry 244 such that a serial CPRI Tx signal can be sent back to the master device. The serial-parallel converter 242 receives from the synchronization circuitry 202 a transmission clock signal Tx Clk, 234 and received from the synchronization circuitry 202 a receiver clock signal Rx Clk, 228. The receiver clock signal Rx Clk, 228 is used by the CPRI transceiver 240 to parallelize and demodulate the received CPRI Rx signal. The transmission clock signal Tx Clk, 234 is used by the CPRI transceiver 240 to serialize and modulate the CPRI Tx signal to be transmitted. The transmission clock signal Tx Clk, 234 is an example of the synchronized clock signal.

The CPRI core circuitry 244 may also be configured to generate and receive signals from a second CPRI link 192 which is coupled to a subsequent slave device (not shown). Thus, the CPRI core circuitry 244 also generates an additional CPRI Tx signal that is provided to a parallel-serial converter P-S, 246 which generates an additional serial Tx CPRI signal to be transmitted as part of the second CPRI link 192. In order to be capable to generate the additional serial Tx CPRI, the transmission clock signal Tx Clk, 234 is also provided to the parallel-serial converter 246. The parallel-serial converter 246 may also de-serialize the received second serial CPRI Rx signal of the second CPRI link 192 and that it receives from a not shown circuitry a second receiver clock signal Rx Clk (not shown) which is synchronized to the received second serial CPRI Rx signal of the second CPRI link 192.

The synchronization circuitry 202, the serial-parallel converter 242 and a portion of the CPRI core circuitry 244 form a first CPRI transceiver of the (slave) device 250. The first CPRI transceiver receives and transmits CPRI signals via the first CPRI link 102 from and to the master device. A not shown synchronization circuitry for generating a second receiver clock signal for the parallel-serial converter 246 forms a second transceiver together with the parallel-serial converter 246 and another portion of the CPRI core circuitry 244

The synchronization circuitry 202 receives an external oscillator clock signal 206 from an external clock generator 204 (which may be an oscillator) and receives also the received (serial) CPRI Rx signal 238. The external synchronization circuitry 202 comprises a Phase Locked Loop (PLL) circuit 208 with a forward loop which comprises a frequency multiplying circuit 209 which generates on basis of the oscillator clock signal 206 a plurality of clock signals 210 which have a frequency that is a first factor $f_1$ higher than the frequency of the oscillator clock signal 206. Each one of the plurality of clock signals 210 have a different phase with respect to each other. In the schematic drawing it has been indicated that there are N clock signal 210 generated by the PLL circuit 208. A specific one of the plurality of clock signal 210 is the transmission clock signal Tx Clk, 234. The plurality of clock signal 210 are provided to a selection circuitry MUX, 233 which selects on basis of a selection signal 216 which one of the plurality of clock signal 210 is selected to be provided to the first frequency divider 232. The first frequency divider 232 divides the frequency of the selected one of the plurality of clock signal by the first factor $f_1$ and thereby generates a feedback signal 230. By selecting a specific one of the plurality of clock signals 210, the phase of the transmission clock signal Tx Clk, 234 may be corrected. As will be discussed later on, because the generated receiver clock signal Rx Clk, 228 also depends on the transmission clock signal Tx Clk, 234, the phase of the generated receiver clock signal Rx Clk, 228 is thereby corrected as well. The selection of the one of the plurality of clock signals 210 is used for the feedback signal is a continuous process that is continuously influenced by the selection signal. Thus, the selection is not a permanent choice, but is a dynamic process.

The synchronization circuitry 202 generates the receiver clock signal Rx Clk, 228 by a clock recovery circuit 236. The clock recovery circuit 236 receives the transmission clock signal Tx Clk, 234 which has approximately the frequency of the received CPRI Rx signal 238. In the clock recovery circuit 236 a PLL may be provided which receives the transmission clock signal Tx Clk, 238 and this PLL generates the receiver clock signal Rx Clk, 228. The clock recovery circuit 236 receives the received CPRI Rx signal 238, which might be provided to the PLL of the clock recovery circuit 236 and the received CPRI Rx signal 238 is used to synchronize the receiver clock signal Rx Clk, 228 to the transmission clock of the master device (not shown). The receiver clock signal Rx Clk, 228 has the frequency of the CPRI link and is synchronized to the transmission clock signal of the master device (which is obtained from the received CPRI Rx signal).

The frequency multiplying circuit 209 of the PLL 208 receives a feedback signal 230 which is based on one of the output signals of the PLL 208 and the selection circuit MUX, 233 influences the phase of the feedback signal 230 such that the generated transmission clock signal Tx Clk, 234 is well-synchronized to the transmission clock signal of the master device (not shown) as available in the received CPRI Rx signal. Thus, there is no need for an external jitter cleaner PLL and the combination of the phase detector 222, the selection signal generator 214 and the selection signal generator 233 replace the external jitter cleaner PLL and directly influence the operation of the multiplying PLL 208.

The synchronization circuitry 202 comprises a second frequency divider 226 which receives the receiver clock signal Rx Clk, 228 from the clock recovery circuit 236. The second frequency divider 226 divides the frequency of the received receiver clock signal Rx Clk, 288 by the first factor $f_1$ and provides the divided receiver clock signal Rx Clk to a phase detector $\Delta\phi$ det., 222. The phase detector $\Delta\phi$ det., 222 also receives the feedback signal 230. The phase detector $\Delta\phi$ det., 222 compares the phases of the two received signals and generates a phase error signal 220 which represents the phase difference between the two received signals. It is to be noted that the phase detector $\Delta\phi$ det., 222 receives signals which have a frequency that is substantially equal to the frequency of the external oscillator signal 206 and, therefore, one does not have to design this circuitry to operate in the gigaHertz range and, therefore, the phase detector does not have to be very complex and expensive.

The phase error signal 220 is provided to a selection signal generator 214 which generates on basis of the received error signal 220 the selection signal 216. The selection signal 216 is suitable for controlling the selection circuitry MUX, 233 such that phase errors between the generate transmission clock signal Tx Clk, 234 and the received signal CPRI Rx 238 can be corrected. The selection signal generator 214 may comprise an integrator and counter circuit 218 which integrates and counts the phase errors to generate the selection signal 216. The integrator and counter circuit 218 allows the loop to track frequency offsets (or phase ramps) with zero steady-state phase error in the presence of a fixed frequency offset. This is an essential property in any clock-data-recovery circuitry. The counter converts the frequency offset above into a change in phase . The operation of the integrator and counter circuitry 218 is more discussed in detail in the context of FIG. 7. In an embodiment, the selection signal generator 214 may comprise a mux controller 212 (MUX CTRL) which receives the output signal of the integrator and counter circuit 218 and determines this output signal to obtain the selection signal 216. Signals that are processed by the integrator and counter circuit 218 and the mux controller 212 relate to signals having a frequency that is substantially equal to the frequency of the external oscillator signal 206. Therefore, their complexity and price is kept relatively low.

The mux controller 212 is a basic circuit meant to clean the noise on the integrated and counter phase error: Adjusting the phase of the generated transmission clock signal Tx Clk, 234 may require fine adjustments of phase. The adjustment of the Phase Locked Loop, 208 feedback (via selection circuit 233) is however rather coarse (only a limited set of integer values). The circuitry which generates the transmission clock signal Tx CLK, 234 (which is the circuitry formed by phase locked loop 208, selection circuit 233 and the frequency divider 232) does not respond immediately to changes in the selection circuit, as it has a Low Pass type response to the steps it sees by the changes in the selection signal 216. In the shown example, the mux controller 212 (or other control circuit) controls the phase, and uses the PLL as a low-pass filter. For example, if the selection circuit 233 requires a feedback divider value of 13.333333, the control circuit quickly toggles the phase such that the effective division of the negative feedback loop of the PLL is toggling between 13 and 14, $\frac{2}{3}$ of the time at 13 and $\frac{1}{3}$ of the time 14, with gives a weighted average value of $(\frac{2}{3}*13)+(\frac{1}{3}*14)$ =13.3333. This toggling happens at a frequency much higher than the PLL bandwidth, and the PLL's low-pass filter characteristics will filter the toggling out, resulting in the weighted average value as division ratio. Said differently, the control circuit will pulse width modulate the signal, and the PLL will perform low pass filtering thereof. This enables to achieve a finer resolution, finer control of frequency and phase than would otherwise be possible.

In the above discussion, the selection circuit MUX, 233 and the first frequency divider 232 are an implementation of a configurable dividing circuit 231 in the feedback path of the PLL circuit 208 that generates in dependence of the selection signal 216 the feedback signal 230 of the PLL that has a frequency that is about the same frequency of the external clock signal 206 and that is based on at least one of the plurality of clock signals 210. In another embodiment, the configurable dividing circuit 231 receives one of the plurality of clock signals and comprises a frequency divider which divides the frequency of this received clock signal by a dividing factor (which is about equal to the first factor) that depends on the received selection signal. By slightly varying, with a relatively high frequency, the dividing factor in dependence of the selection signal 216, the phase of the transmission clock signal Tx Clk, 234 may be correct and synchronized to the phase of the transmission clock signal of the master device (not shown). For example, when the first factor is 10, the configurable dividing circuit 231 may vary (with a relatively high frequency) its dividing factor between 9.95 and 10.05 to correct the phase of the transmission clock signal Tx Clk, 234.

Based on the above description, it may be concluded that the synchronization circuitry 202 is well capable to synchronize the transmission clock signal Tx Clk, 234 to the transmission clock signal of the master device (not shown). Thereby the (slave) device 250 is capable of fulfilling synchronization and jitter requirements of the CPRI standard without using an external jitter cleaner PLL circuitry.

It will be apparent that the example is just an example of a synchronization circuitry which comprises a controllable phase locked loop, PLL, 208,508 for generating the transmit clock and a frequency and phase tracking loop which controls the PLL. The PLL comprises a PLL output for outputting a synchronized clock signal Tx Clk, 234, a first phase input coupled to the clock input port and a second phase input coupled to the PLL output via a negative feedback loop. The frequency and phase tracking loop couples the received signal input and the second phase input to a control input of the controllable PLL, for providing a negative feedback which controls a phase and/or frequency of the feedback signal to counter the phase and or frequency error between the external clock signal 206 and the received signal. The frequency and phase tracking loop may control any other suitable parameter of the PLL, such as the division factor of the frequency divider or otherwise.

The CPRI link 102 operates at a specific frequency. The CPRI standard defines fixed values from 1.2288 GHz to 12.288 GHz. In an embodiment, the external oscillator 204 operates at 122.88 MHz, and thus, when the CPRI link operates at 1.2288 GHz, the first factor $f_1$ equals 10; when the CPRI link operates at 12.288 GHz, the first factor $f_1$ shall be equal to 100.

In the above, the PLL circuit 208 generates N clock signals each having a different phase. In practical embodiments the value for N may be 8 or 16 results in enough synchronization correction accuracy.

Although the above synchronization circuitry 202 is discussed in the context of communication via CPRI links, the synchronization circuitry 202 may also be used for other types of digital networks in which a transceiver has to synchronize with high accuracy to a clock of another device on basis of the received signal.

Figure 5:
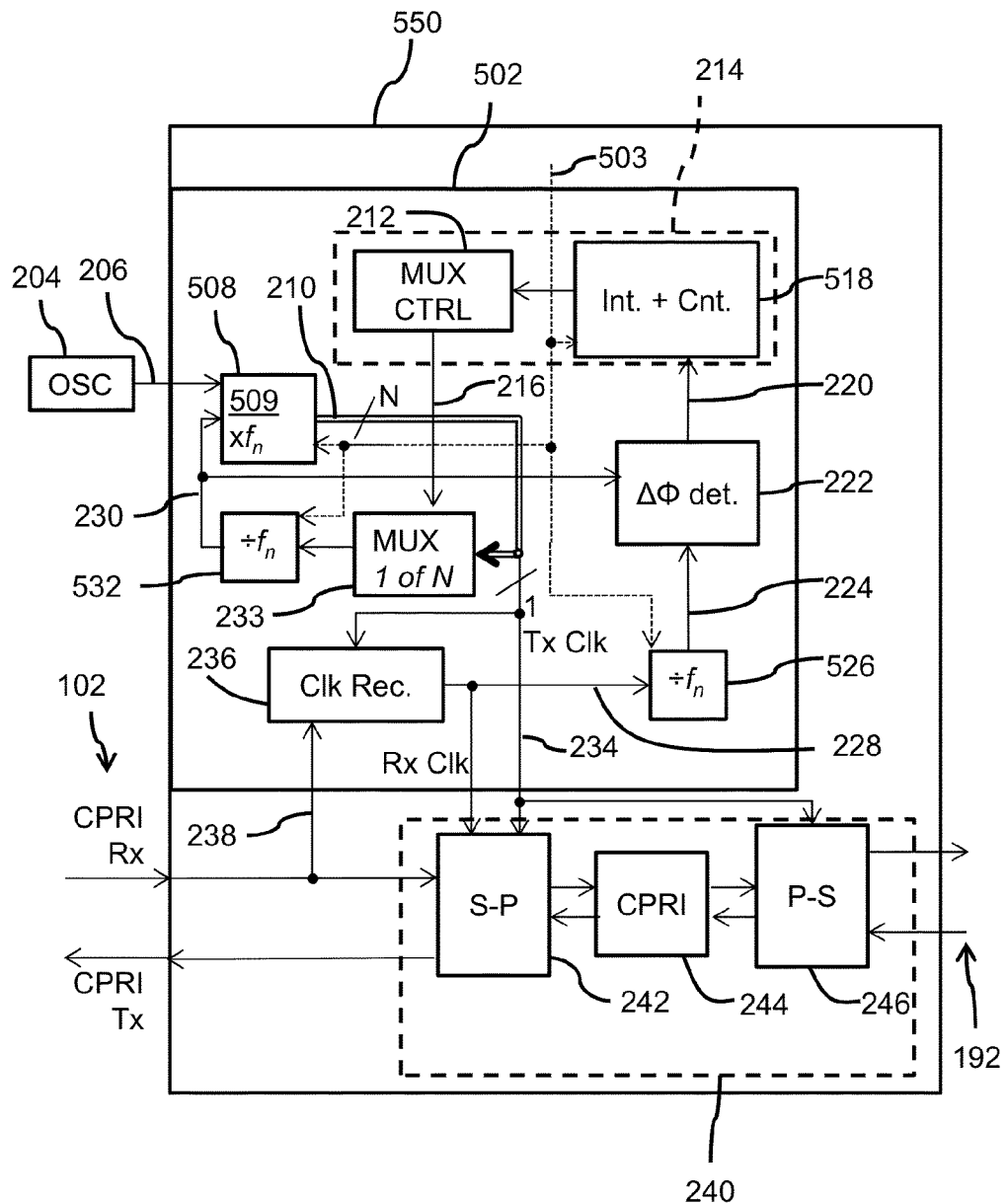
FIG. 5 shows a further embodiment of the synchronization circuitry in the (slave) device, suitable for the examples of FIGS. 3 and 4

FIG. 5 shows a further embodiment of the (slave) device 550. The (slave) device 550 has similar characteristics as the (slave) device 250 of FIG. 2, however, some elements of the synchronization circuitry 502 are different from the synchronization circuitry 202 of FIG. 2. As discussed previously, CPRI links may operate at different speeds from 1.2288 GHz to 12.288 GHz. The synchronization circuitry 502 is configured to generate receiver and transmission clock signals Rx Clk, 228, Tx Clk, 234 which may be adapted to the speed of the CPRI link. In the discussion of FIG. 2 it has been assumed that the first factor $f_1$ has a fixed value and this fixed value defines (in combination with the frequency of the external clock signal 206) the frequency of the generated receiver and transmission clock signals Rx Clk, 228, Tx Clk, 234. Therefore, the synchronization circuitry 502 receives a factor signal 503 which indicates what the variable factor $f_n$ is between the speed of the CPRI link 102 and the frequency of the external clock signal 206.

The synchronization circuitry 502 further comprises a configurable Phase Locked Loop (PLL) circuit 508, a first configurable frequency divider 532, a second configurable frequency divider 526 and a configurable integrator and counter circuit 518. The functions of the configurable Phase Locked Loop (PLL) circuit 508, the first configurable frequency divider 532, the second configurable frequency divider 526 and the configurable integrator and counter circuit 518 are similar to functions of the Phase Locked Loop (PLL) circuit 208, the first frequency divider 232, the second frequency divider 226 and the integrator and counter circuit 218 of FIG. 2, respectively. The factor signal 503 is provided to the frequency multiplier 509 of the configurable Phase Locked Loop (PLL) circuit 508, the first configurable frequency divider 532, the second configurable frequency divider 526 and the configurable integrator and counter circuit 518. The configurable phase locked loop (PLL) circuit 508 is configured to generate the plurality of clock signal 210 that have a frequency that is the variable factor $f_n$ higher than the frequency of the received external clock signal 206. The first configurable frequency divider 532 and the second configurable frequency divider 526 are configured to divide the frequency of their input signal into a signal that has a frequency that is the variable factor $f_n$ lower. The configurable integrator and counter circuit 518 changes in response to the factor signal 503 specific parameters of the change in phase that is performed by the configurable integrator and counter circuit 518. The output of the configurable integrator and counter goes into mux controller that creates the selection signal 216. Thereby the configurable integrator and counter circuit 518 and the mux controller 212 generate the selection signal 216 in such a way the required one of the plurality of clock signals is selected as feedback signal to the frequency multiplier 509.

By using such a factor signal 503 and using the configurable frequency multiplier 509, the first configurable frequency divider 532, the second configurable frequency divider 526 and the configurable integrator and counter circuit 518, most circuits of the synchronization circuit 502 process signals that have a frequency of the external clock signal 206. Thereby it is prevented that complex and expensive measures must be taken to operate such circuits at, for example, 10 gigaHertz.

Figure 6:
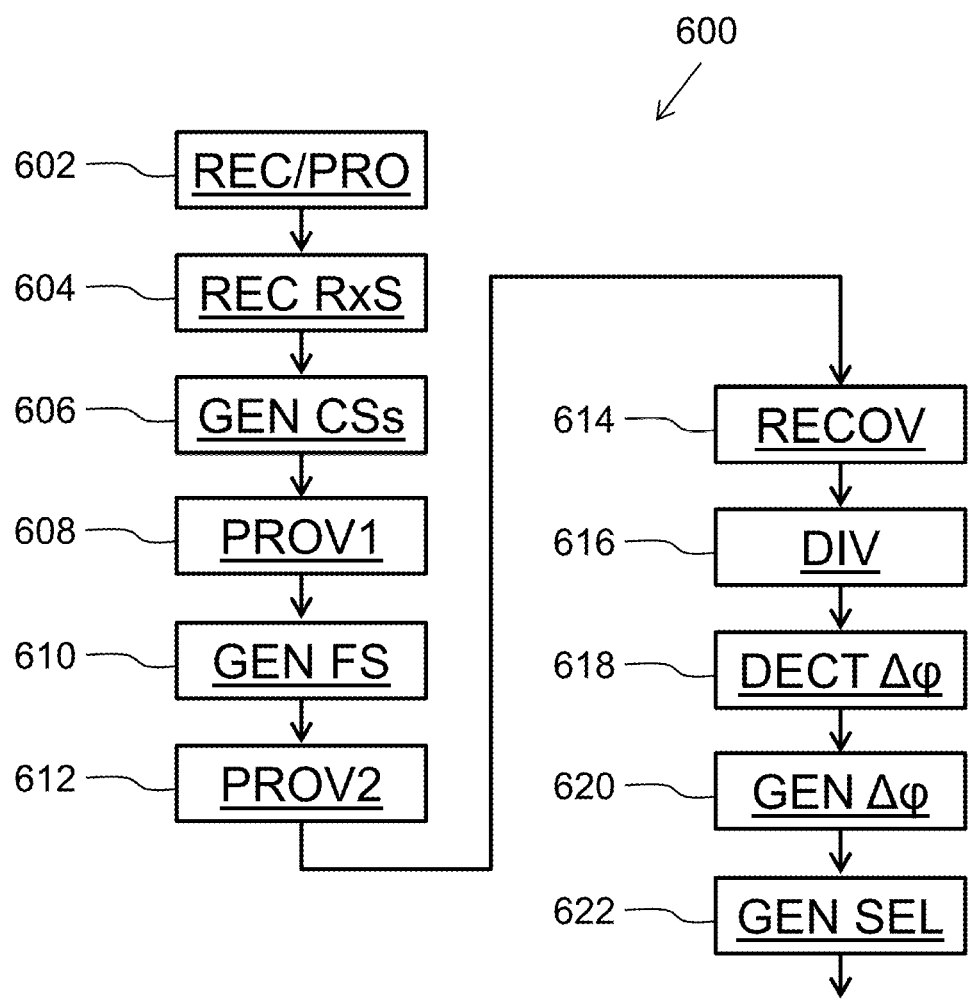
FIG. 6 shows an embodiment of a method of synchronizing a synchronized clock signal of a second transceiver to a clock of a first transceiver based on a received signal.

FIG. 6 shows an embodiment of a method 600 of synchronizing a synchronized clock signal of a second transceiver to a clock of a first transceiver based on a received signal. The method 600 comprises the stages of: a) receiving REC, 602 an external clock signal from an external clock generator and providing PRO, 602 the external clock signal to a first input of a phase locked loop circuit, b) receiving REC RxS, 604 the received signal that is transmitted by the first transceiver, c) generating GEN CSs, 606 in the phase locked loop circuit a plurality of clock signals having a frequency that is a first factor higher than a frequency of the external clock signal, all clock signals of the plurality of clock signals have a different phase, d) providing PROV1, 608 a transmission clock signal, the transmission clock signal being a first one of the plurality of clock signals, e) generating GEN FS, 610 a feedback signal in a configurable dividing circuitry in dependence of a selection signal and on basis of the plurality of clock signals, f) providing PROV2, 612 the feedback signal to a second input of the phase locked loop circuit, g) recovering RECOV, 614 a receiver clock signal from the received signal and the transmission clock signal in a clock recovery circuit, h) obtaining DIV, 616 a frequency divided receiver clock signal from the receiver clock signal by dividing a frequency of the receiver clock signal by the first factor, i) detecting DECT $\Delta\phi$, 618 a phase error between the feedback signal and the frequency divided receiver clock signal, j) generating GEN $\Delta\phi$, 620 a phase error signal based on the detected phase error, k) generating GEN SEL, 622 in a selection signal generator the selection signal based on the phase error signal.

Figure 7:
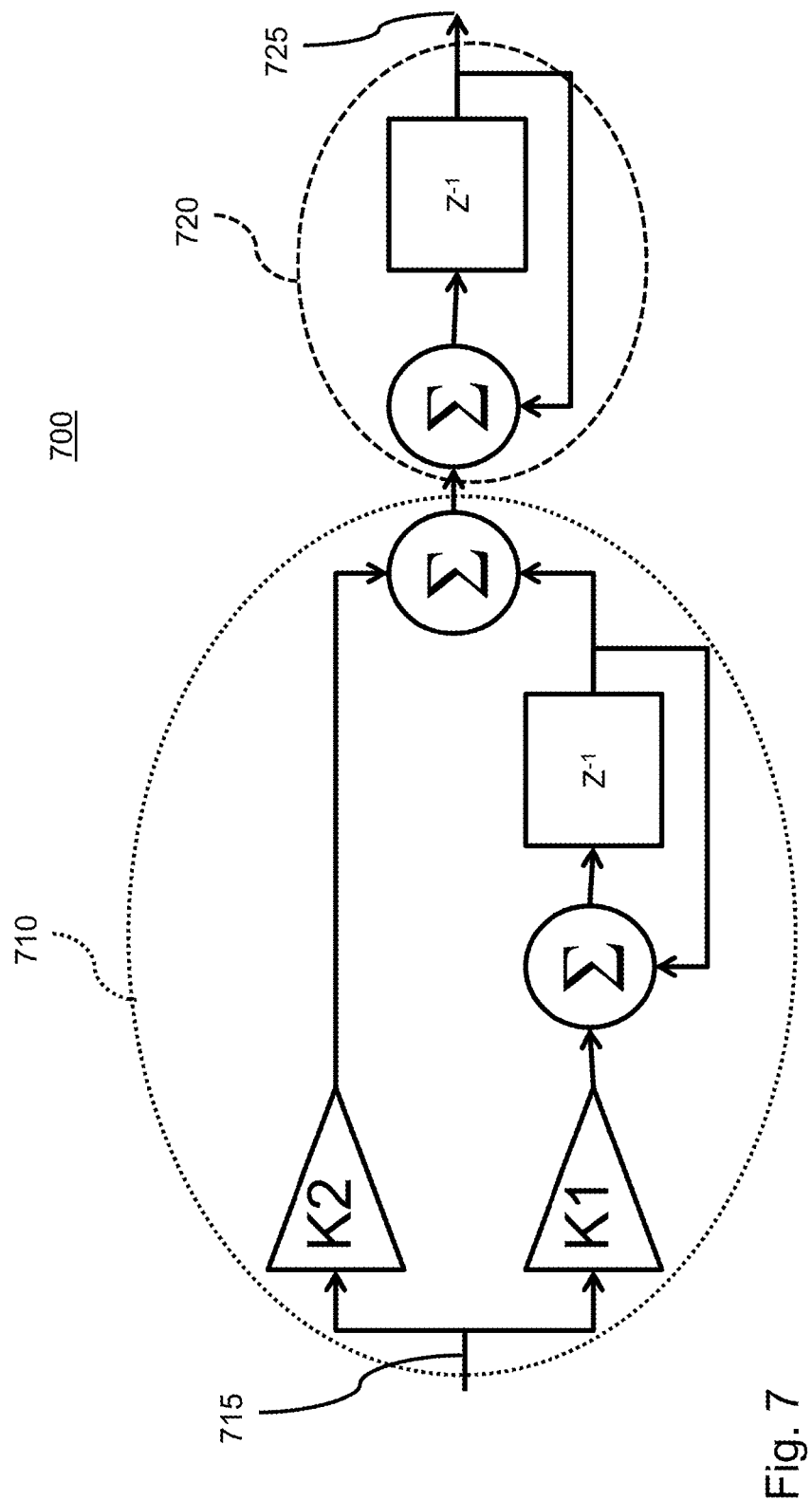
FIG. 7 shows an example of a configurable integrator and counter circuitry.

FIG. 7 shows an example of a configurable integrator and counter circuitry 700. In particular the block diagram of an integrator and counter for a specific CPRI link rate is shown. The configurable integrator and counter circuitry 700 has a configurable integrator 710 having an input 715, which may be coupled to an output of the phase detector, for example, phase detector 222 of FIG. 5 for receiving the phase error signal 220 as described before. The configurable integrator 710 has a gain factor K1 in an integrating path and a gain factor K2 in a direct path, both paths being summed to constitute an output signal. The coefficients K1 and K2 are chosen to set the tracking loop gain and bandwidth based on the phase tracking error performance required, and on how quickly the phase of the incoming serial data stream is changing. The K2 path is used to stabilize the tracking loop.

The output of the configurable integrator 710 may be coupled to a counter 720 having an output 725. The output 725 may be coupled to the selection circuit 233 of FIG. 5, for example via the mux controller 212 of FIG. 5. The counter counts the integrated phase error signal.

The configurable integrator and counter circuitry 700 is configurable according to the link rate by adapting the gain factor K1 and/or K2. So the configurable integrator and counter circuitry is configurable and thus supports all CPRI frequencies. Each CPRI frequency requires a different integrator configuration. These characteristics enable the system to be agnostic to CPRI frequencies. The configurable integrator and counter circuitry 700 allows the tracking clock circuit to track fixed frequency offsets (or phase ramps) with zero steady-state phase error. This helps to recover the incoming serial data error free. The value in the integrator is proportional to the frequency offset (or difference) between the local Voltage Controlled Oscillator (VCO) frequency and the data rate of the incoming serial data stream.

The counter 720 converts (integrates) the frequency offset above into a change in phase to be applied via the selection circuit 233. This eventually modifies the phase of the Phase Locked Loop's 508 VCO such that its frequency and phase match that of the incoming serial data stream.

In the context of FIG. 2 the integrator and counter circuitry 214 is not by definition configurable. This integrated and counter circuitry 214 is similar to the above discussed configurable integrator and counter circuitry 700 with only the minor difference that the factors K1 and K2 cannot be changed in dependence of the frequency of the received signal.

In the foregoing specification, the invention has been described with reference to specific examples of embodiments of the invention. It will, however, be evident that various modifications and changes may be made therein without departing from the broader scope of the invention as set forth in the appended claims, and that the claims are not limited to the specific examples described above. For example, the PLL of another type that can be controlled by another type of frequency/phase tracking loop, e.g. a non-integer PLL, such as with a $\Delta\Sigma$ divider, of which the division ratio is controlled by the tracking loop. Likewise, instead of a CPRI compliant or compatible interface between the sub-systems, another type of interface may be provided suitable for mobile communication base-station systems. Also, the connections may be any type of connection suitable to transfer signals from or to the respective nodes, units or devices, for example via intermediate devices. Accordingly, unless implied or stated otherwise the connections may for example be direct connections or indirect connections.

Some of the above embodiments, as applicable, may be implemented using a variety of different data processing systems. For example, although FIGS. 2 and 5 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A controller device for a data interface between a slave sub-system and a master sub-system in a chain of at least two sub-systems in a mobile communication base station system, each of the sub-systems comprising at least one slave sub-system and at least one master sub-system for controlling the time of the slave sub-system, the at least one master sub-systems comprising a synchronization master sub-system controlling a time synchronization of the chain to an external clock external to the chain, the controller device comprising:

a slave transceiver, for receiving a received signal representing binary data from a master sub-system, the binary data having a bit duration controlled by a clock cycle of a transmit clock of the master sub-system, and the transmitting data to the master sub-system, the transceiver being connected with a clock input to a controllable phase locked loop, PLL, for clocking the transceiver with the transmit clock; and a synchronization device for synchronizing the transmit clock of the slave transceiver to a clock of a master transceiver of the master sub-system based on the received signal received from the master sub-system, the synchronization circuitry comprising:

a clock input port for receiving an external clock signal from an external clock generator;

a received signal input port for receiving the received signal from the master transceiver;

said PLL, for generating the transmit clock, the PLL comprising a PLL output for outputting the transmit clock, a first phase input coupled to the clock input port and a second phase input coupled to the PLL output via a negative feedback loop for providing a negative feedback signal; and a frequency and phase tracking loop coupling the received signal input and the second phase input, for providing a selection signal which controls a phase and/or frequency of the negative feedback signal to counter phase and or frequency error between the external clock signal and the received signal, wherein the frequency and phase tracking loop comprises:

a clock recovery circuit for generating a receiver clock signal on basis of the transmit clock signal and the received signal, a phase detector circuit for generating a phase error signal, the phase detector circuit receiving the negative feedback signal and the receiver clock signal of which the frequency is divided by a first factor, the phase error signal indicating a phase difference between the negative feedback signal and the divided receiver clock signal, a selection signal generator for generating the selection signal on basis of the phase error signal, to select the selected clock signal, wherein the selection signal generator comprises an integrator and counter circuit for generating the selection signal.

2. The controller device as claimed in claim 1, wherein the PLL comprises:

a frequency multiplying circuit for generating a plurality of clock signals each having a different phase and having a frequency that is a first factor higher than a frequency of the external clock signal, a first one of the plurality of clock signals being selected as the transmit clock signal; and the negative feedback loop comprising a configurable dividing circuit for generating the negative feedback signal from at least one selected clock signal out of the plurality of clock signals.

3. The controller device according to claim 1, wherein the configurable dividing circuitry comprises a selection circuit and a first frequency divider, the selection circuit arranged to dynamically select a selected one of the plurality of clock signals from the plurality of clock signals in dependence on the selection signal, the first frequency divider is arranged to generate the negative feedback signal by dividing the frequency of the selected one of the plurality of clock signals by the first factor.

4. The controller device according to claim 1, wherein the integrator and counter circuit is configured to generate the selection signal on basis of calculating the change in phase.

5. The controller device according to claim 1, wherein the selection signal generator comprises a mux controller circuit for selecting the selected clock signal.

6. The controller device according to claim 1 further comprising a second frequency divider, the second frequency divider is provided in between an output of the clock recovery circuit and an input of the phase detector circuit for dividing the frequency of the receiver clock signal by the first factor.

7. The controller device according to claim 1, wherein a frequency of the received signal is a selected one of a plurality of predefined allowed frequencies and the master sub-system and slave sub-system are configured to send and receive data at different speeds.

8. The controller device according to claim 7, wherein the first factor is a configurable factor in dependence of the frequency of the received signal.

9. The controller device according to claim 4, wherein the integrator and counter circuit is configurable in dependence of the frequency of the received signal, wherein parameters of the change in phase are configured in dependence of the frequency of the received signal.

10. The controller device according to claim 1, wherein the interface is compliant or compatible with common public radio interface standard version 1 or higher.

11. An integrated circuit comprising the device according to claim 1.

12. A RF or baseband sub-system for a base station in a mobile communication system, comprising the controller device according to claim 1.

13. A mobile communications base station system, comprising at least one chain of at least two sub-systems, the sub-systems comprising at least one slave sub-system and at least one master sub-system for controlling the second sub-system, at least one first sub-systems being a synchronization master controlling time in the chain, wherein at least one of the master systems is a baseband subsystem, at least one of the slave subsystem is a radio frequency subsystem and at least one of the slave subsystems is an RF or baseband sub-system as claimed in claim 12.

14. A method of synchronizing a synchronized clock signal of a second transceiver to a clock of a first transceiver based on a received signal, the method comprising:
    receiving an external clock signal from an external clock generator and providing the external clock signal to a first input of a phase locked loop circuit,
    receiving the received signal that is transmitted by the first transceiver,
    generating in the phase locked loop circuit a plurality of clock signals having a frequency that is a first factor higher than a frequency of the external clock signal, all clock signals of the plurality of clock signals have a different phase,
    providing the synchronized clock signal, the synchronized clock signal being a first one of the plurality of clock signals,
    generating a feedback signal in a configurable dividing circuitry in dependence of a selection signal and on basis of the plurality of clock signals,
    providing the feedback signal to a second input of the phase locked loop circuit,
    recovering a receiver clock signal from the received signal and the synchronized clock signal in a clock recovery circuit,
    obtaining a frequency divided receiver clock signal from the receiver clock signal by dividing a frequency of the receiver clock signal by the first factor,
    detecting a phase error between the feedback signal and the frequency divided receiver clock signal,
    generating a phase error signal based on the detected phase error,
    generating in a selection signal generator comprising an integrator and counter circuit the selection signal based on the phase error signal, and
    using the selection signal to select one of the plurality of clock signals.

15. The method according to claim 14, wherein a frequency of the received signal may be a selected one of a plurality of predefined allowed frequencies and the method further comprises the stage of adapting the first factor in dependence of the frequency of the received signal.

16. The method according to claim 15, in generating a phase error signal comprises calculating a change in phase of detected phase errors and wherein parameters of the change in phase are adapted to the frequency of the received signal.

* * * * *